March 11, 1969     B. J. WILSON     3,432,350

SEA WATER BATTERY

Filed June 29, 1967

INVENTOR
BURTON J. WILSON

BY

ATTORNEYS

United States Patent Office 3,432,350
Patented Mar. 11, 1969

3,432,350
SEA WATER BATTERY
Burton J. Wilson, Bethesda, Md., assignor to the United States of America as represented by the Secretary of the Navy
Filed June 29, 1967, Ser. No. 650,140
U.S. Cl. 136—90                                      6 Claims
Int. Cl. H01m 23/02

ABSTRACT OF THE DISCLOSURE

A sea water battery having a succession of cells which with the exception of the first are closed to influx of ambient sea water on immersion of the battery and in operation of the battery are opened in a delayed cell-sequence. A tensed resilient closure seals each of the cells at the periphery and is broken in operation of the battery through the partial flooding and activation of a closed cell with sea water from the immediately preceding cell which enters the closed cell through openings in its cathode and side wall and through an erosion-developed opening in the adjacently located consumable anode of the preceding cell.

---

This invention relates to primary cell batteries which are activated with sea water and generally referred to as sea water batteries.

Prior art sea water batteries are of a design that on immersion in sea water, all the cells are activated at the one time. The operating life of these multicell batteries is equivalent to that of a single cell operating at the like current output which, generally, is of the order of about one of two hours at high current output rates.

It is the general object of the present invention to provide sea water batteries which will deliver low voltage-high current power for longer periods of time than those of the prior art.

It is a particular object to provide sea water batteries in which the cells are activated in a delayed cell-sequence when the batteries are immersed in sea water.

The above and other objects are accomplished in the sea water batteries of the present invention which comprise, broadly stated, insulator plates which define the side walls of the cells, a pair of spaced, flat, circular, consumable metal anodes and nonconsumable metal cathodes in each cell which are mounted on the insulator plates and in an order in which the anode of a preceding cell is adjacent to the cathode of the succeeding cell, an opening in those of the insulator plates which bear an adjacent anode and cathode and in the cathodes thereon, for flow of sea water from a preceding cell to a succeeding cell after erosion-breakthrough of the adjacent anode near the openings, a separate releasable resilient closure on each of the cells, with the exception of the first, which seals them at the periphery against direct influx of ambient sea water thereinto, and means on the batteries including a delayed-contact switch in each of the closed cells for breaking the resilient closures in response to partial flooding and activation of the closed cells by inflow of sea water from a preceding cell.

A more complete understanding of the sea water batteries of the present invention is had from the following description when read in conjunction with the accompanying drawing in which like numerals indicate like parts and:

FIG. 1 is a showing, partly in section and partly broken away, of a sea water battery in accordance with the invention, FIG. 2 is an enlarged detail showing of a delayed-contact switch used in certain of the cells as shown in the sea water battery of FIG. 1, and FIG. 3 is a showing of a portion of a screen cathode for a sea water battery in accordance with the invention.

Referring to FIG. 1, the sea water battery 10 has a succession of cells in which the first cell 11 is open to direct influx of ambient sea water and the succeeding cells 12 are closed thereto on immersing the battery in sea water.

The cells 11 and 12 contain a pair of spaced, flat circular electrodes which are consumable metal anodes 13 and nonconsumable metal cathodes 14. The electrodes are mounted on circular insulator plates 15 and 16 which define the side walls of the cells and are of larger diameter than the electrodes. The electrodes are arranged in the cells in an order in which an anode is mounted on the side wall 15 of the last cell and a cathode on the side wall 15 of the first cell and an anode and cathode are mounted on the opposite faces of the side walls 16 of the intermediately disposed cells.

One or more openings 17 and 18 are provided in each of the insulator plates 16 and the cathode thereon for flow of sea water from the preceding cell to the succeeding cell on erosion-breakthrough of the anode in the preceding cell. Openings of about ¼ inch diameter are suitable for a one foot diameter cathode.

The cells 12 are sealed against direct influx of ambient sea water on immersion of the battery by means or separate resilient bands 19, located between the extensions of the cell side walls 16 and stretched over and seated on the periphery of the electrodes 13 and 14. The resilient closures 19 are suitably quad-rings, as shown, of a vulcanized elastomer which may be natural or synthetic rubber.

A number of squibs 21 with a cutter blade 22 on a captive piston 23 are supported on the battery in an arrangement in which a cutter blade is aligned with each of the cells 12 to intercept and sever the tensed resilient closure 19 when propelled by the ignited squib. The cutter blade 22 is convexly curved to effect severance of the tensed quad-ring 19 at the low center portion and the length of travel for the propelled cutter blade is selected to avoid contact of the cutter blade with the electrodes in effecting the severance.

The squibs 21 with the associated cutter blade may be supported in position on the battery in any suitable manner. As shown, they are supported in circular openings 24 in a metal strip 25 which is secured to the insulator plates 15 and 16 by screws (not shown) which extend through the strip into the insulator plates. The openings 24 are threaded at their entrance to receive a complementary threaded metal plug 26 for securing the squip 21 and associated cutter blade in position therein.

A delayed-contact switch 28 is located in the lower section of each of the cells 12. The switch, which may be made of a 10–20 mil spring steel wire, is shown more clearly in FIG. 2. The switch is supported by the cathode 14 on the insulator plate 16 through a small block 29 of a water-insoluble insulating plastic such as nylon or polystyrene which is adhered to the cathode by a water-insoluble adhesive and in which the supporting end of the switch is anchored. The terminal 30 is normally urged into contact with the anode 13 on the insulator plate 16 by the bowed section 31 but intercepted by a strip 32 of insulating material which is soluble in water and adhered to the anode 13. The water-soluble insulating strip 32 may be a section of a sheet of polyvinyl alcohol or of polyethylene oxide of 1½ to 10 mils thickness and is adhered to the anode 13 by wetting it with water sufficiently to cause it to adhere to the anode.

The switch 28 is electrically connected in each cell 12 with a squib 21 for the cell by a rubber insulated lead wire 33 which is soldered to the bowed section 31 and a rubber insulated lead wire 34 soldered to the cathode 14. The lead wire 33 is drawn through an aperture 35 in the cathode 14 which is of a diameter to form a water-tight seal with the rubber insulation on the lead wire. The lead wire 33 and the lead wire 34 from the cathode are brought down through a recess 36 in the insulator plate 16 and a channel 27 in the strip 25 to the terminals on the squib 21.

The cells of the battery are electrically connected in parallel to a load by conductor rods 37 and 38 which are connected, respectively, with leads 39 soldered to the cathodes and leads 40 soldered to the anodes. The leads 39 and 40 are suitably narrow strips of a 5 mil thick copper ribbon. In the cells 12, these leads are soldered to the electrodes close to the insulator plates 16.

The consumable metal anode 13 of the cells may be a plate or sheet of magnesium or of high mangnesium base alloys as has been previously described in the art for sea water batteries. High magnesium base alloys which contain small amounts of aluminum are preferred for the anode since they will yield a flakey corrosion product which is more easily dislodged from the anode in operation of the cells. Suitable magnesium alloys of this kind are, for example, AZ31B and AZ61A, so designated by ASTM nomenclature and the commercial alloy known as Gemag. The term magnesium anode as used herein is intended to include anodes made of magnesium and high magnesium base alloys. While the thickness of the anode is determined on the basis of the operating life for the cell, it should be at least that which will provide a sealing shoulder for the tensed resilient ring which closes the cell at the periphery. Generally an anode thickness of from about ⅛ to ¼ inch will be found suitable.

The nonconsumable metal cathodes 14 may be a plate or sheet of iron, mild steel, copper, brass, bronze, nickel, etc. or of steel which has been nickel plated or, additionally, has a plating of palladium over the nickel plating. The thickness of the cathode may vary but it also should be at least sufficient to provide a sealing shoulder for the tensed resilient ring which closes the cell at the periphery. Generally a thickness of about ⅛ inch will be found suitable.

In a preferred embodiment and as illustrated in FIG. 3, the cells of the batteries of the invention are provided with a circular metal screen cathode 41 which has an outer surface of granular palladium plating thereon. The substrate wire screen 42 of the cathode 41 may be from about 8 to 40 mesh, preferably is from about 8 to 24 mesh and further preferably is from about 8 to 12 mesh. The substrate screen is suitably woven wire cloth, although other mesh constructions may be used. The metal of the wire screen may be iron, mild steel, copper, brass, bronze, nickel, etc. The outer surface of granular palladium plating may be deposited directly on the wire screen substrate or on an underplating of electroless nickel previously deposited on the substrate screen. These plated screen cathodes may be prepared as described in my copending application, Ser. No. 628,250, filed Mar. 31, 1967.

The wire substrate screen 42 of the cathode 41 is provided with a metal frame 43 and with a pair of spaced metal sleeves 44, of which only one is shown, which are soldered to the substrate screen. The metal of the frame 43 and of the sleeves 44 may be the same as that of the substrate wire screen 42 and plated along with it. The metal frame 43 should have a width sufficient to provide a sealing shoulder for the tensed resilient closure at the periphery of the cell and a depth to provide for passage therethrough of the lead wire 33 and soldering of the lead wire 34 thereto. The open construction of the screen cathode provides paths for flow of sea water from the preceding to the succeeding cell on erosion-breakthrough of the anode of the preceding cell.

The insulator plates 15 and 16 may be made of wood or of a firm plastic such as nylon, polystyrene or polymethylmethacrylate. They may be circular or rectangular in shape and should be of a width to accommodate a recess therein for the lead wires from the delayed-contact switch to the squib and to receive screws or other fastening elements for securing the squib-supporting strip to the battery.

The anodes and cathodes may be adhered to the insulator plates 15 and 16 by a suitable water-resistant adhesive such as the silicon rubber adhesive which is commercially available under the trade name Silastic. Where the plastic of the insulator plates may be softened by heating, as in the case of those specifically mentioned above, the metal plate electrodes and the metal frame in the case of the screen cathode is pressed into the heat softened face of the plastic insulator plate which is then allowed to cool to harden the plastic and hold the electrode firmly in place.

The anode and cathode are spaced apart in the cells a distance which is as short as possible to minimize internal cell resistance and yet provide room for the delayed-contact switch and flow of sea water between the electrodes and washing away of the corrosion product of the anode. A suitable spacing between the electrodes is about ¼ inch.

The batteries of the invention are assembled with the use of tubular plastic insulator sheathings 45 and tubular plastic insulator spacers 46 which fit over the sheathings between the electrodes in the cells. The sheathings and spacers may be made of a plasticized polyvinylchloride tubing known as Tygon. The insulator plates are provided with pairs of openings 47 by which they are mounted on the sheathings 45 in a water-tight fit. The attached electrodes have corresponding openings which in the case of the screen cathodes 41 are defined by the metal sleeves 44. Rods, 48, threaded at each end, fit snugly in the sheathings 45 and are locked in position by the flanged threaded nuts 49 to secure a tight assembly of the cells formed by the spaced insulator plates and attached electrodes.

On immersion of a battery of the invention in the sea, the first cell 11, which is open, is activated by the inflow of seat water to deliver low voltage power to the load with which the cells are electrically connected in parallel and will continue to deliver power until the metal anode 13 is consumed. However, in the course of operation of the cell 11, as an erosion-breakthrough of the anode will occur at or near the openings 17 and 18 in the side wall 16 and cathode 14, respectively, of the succeeding cell 12 and sea water will flow from the cell 11 into this cell 12 and activate it. The flow of sea water from the cell 11 will continue until the succeeding cell 12 is partially flooded to the extent that the water-soluble insulator strip 32 on the anode of this cell 12 is immersed in sea water and thereby dissolved from the anode. The terminal 30 of the switch 28 will then make electrical contact with the anode in the cell 12 and send current to the squib 21 which is thereby ignited. Ignition of the squib will propel the cutter blade 22 into contact with the tensed quad-ring 19, severing it and opening this activated cell 12 to flow of ambient sea water through it. The same action is repeated for the other cells 12 in operation of the battery.

The sea water batteries of the invention are useful as low voltage power sources for operation of sea-based devices such as sonar buoys and light beacons.

By virtue of operating with activation of the cells in a delayed cell-sequence, the sea water batteries of the invention are capable of delivering low voltage-high current power for periods of time which are determined by the operating life of the single cell multiplied by the number of cells in the battery. The batteries also have the advantage of direct flow of sea water through each of the opened operating cells which promotes washing away of the corrosion product of the consumable metal anode.

While the invention has been described herein with reference to a particular embodiment thereof, the same is intended by way of illustration and not in limitation except as may be defined in the appended claims.

The invention described herein may be manufactured and used by or for the Government of the United States of America for governmental purposes without the payment of any royalties thereon or therefor.

What is claimed and desired to be secured by Letters Patent of the United States is:

1. A battery of primary cells which may be activated with sea water and comprise:

an assembly of spaced flat insulator plates which form the side walls of the cells, means on which said insulator plates are mounted which forms a water-tight seal with said insulator plates, flat circular electrodes which are consumable metal anodes and nonconsumable metal cathodes, said electrodes being mounted on the faces of said insulator plates and in an order in which an anode and a cathode are provided in each cell and the anode of the preceding cell is adjacent to the cathode of the succeeding cell, at least one opening in those of said insulator plates which have an anode mounted on one face and a cathode on the other and in the area covered by these electrodes and correspondingly in the cathode mounted thereon, a severable, tensed, resilient closure on and peripherally sealing each of said cells with the exception of the first cell thereof, and means for separately severing each of said resilient closures in response to the partial flooding and activation of said sealed cells in a delayed cell-sequence with sea water flowing thereinto from the immediately preceding operating cell.

2. A battery of primary cells as defined in claim 1, wherein the resilient closure is a tensed, vulcanized elastomer quad-ring.

3. A battery of primary cells as defined in claim 1, wherein said means for separately severing the tensed resilient closures on the sealed cells includes a cutter blade for each of the sealed cells and means for propelling the cutter blade into severing contact with the tensed resilient closure.

4. A battery of primary cells as defined in claim 3, wherein said means for propelling the cutter blade includes an electrically-fired squib which is positioned near the periphery of each of the sealed cells and has a captive piston to which the cutter blade is attached.

5. A battery of primary cells as defined in claim 4, wherein a delayed-contact switch is positioned in the lower section of each of the sealed cells and has a terminal normally urged to make electrical contact with the anode of the sealed cell and in the closed position forms part of an electrical circuit which includes the anode and cathode of the sealed cell and the squib.

6. A battery of primary cells as defined in claim 5, wherein a water-removable insulator is attached to the anode of each of the sealed cells and in position to intercept the terminal of the delayed-contact switch which is normally urged into contact with said anode.

References Cited

UNITED STATES PATENTS

| | | | |
|---|---|---|---|
| 2,404,144 | 7/1946 | Riggs et al. | |
| 2,590,584 | 3/1952 | Taylor. | |
| 3,053,928 | 9/1962 | Hopkins | 136—90 |
| 3,321,335 | 5/1967 | Wilson. | |

WINSTON A. DOUGLAS, *Primary Examiner.*

C. F. LE FEVOUR, *Assistant Examiner.*

U.S. Cl. X.R.

136—100